(12) United States Patent
Yu

(10) Patent No.: US 8,991,542 B2
(45) Date of Patent: Mar. 31, 2015

(54) MOTORIZED REVERSE TRIKE WITH TILTABLE BODY

(71) Applicant: Jinjun Yu, Zheijiang (CN)

(72) Inventor: Jinjun Yu, Zheijiang (CN)

( * ) Notice: Subject to any disclaimer, the term of this patent is extended or adjusted under 35 U.S.C. 154(b) by 0 days.

(21) Appl. No.: 14/371,315

(22) PCT Filed: Jan. 11, 2013

(86) PCT No.: PCT/CN2013/070385
§ 371 (c)(1),
(2) Date: Aug. 22, 2014

(87) PCT Pub. No.: WO2013/104335
PCT Pub. Date: Jul. 18, 2013

(65) Prior Publication Data
US 2014/0375015 A1    Dec. 25, 2014

(30) Foreign Application Priority Data

Jan. 14, 2012    (CN) .................... 2012 2 0033590 U

(51) Int. Cl.
| B62D 61/06 | (2006.01) |
| B62K 5/10 | (2013.01) |
| B62K 5/027 | (2013.01) |
| B62K 5/05 | (2013.01) |
| B62K 25/24 | (2006.01) |
| B62K 5/08 | (2006.01) |
| B62K 5/00 | (2013.01) |

(52) U.S. Cl.
CPC . *B62K 5/10* (2013.01); *B62K 5/027* (2013.01); *B62K 5/05* (2013.01); *B62K 25/24* (2013.01); *B62K 5/08* (2013.01); *B62K 2005/001* (2013.01)

USPC ....... 180/210; 180/76; 180/209; 280/124.103

(58) Field of Classification Search
USPC .......................... 180/209, 210, 282, 76, 908; 280/124.103, 755
See application file for complete search history.

(56) References Cited

U.S. PATENT DOCUMENTS

| 4,020,914 A * | 5/1977 | Trautwein ...................... 180/210 |
| 4,887,829 A * | 12/1989 | Prince ............................ 280/282 |
| 6,763,905 B2 * | 7/2004 | Cocco et al. .................. 180/210 |
| 7,264,251 B2 * | 9/2007 | Marcacci ............... 280/124.103 |
| 7,562,885 B2 * | 7/2009 | Marcacci ............... 280/124.103 |
| 8,317,207 B2 * | 11/2012 | Mercier .................. 280/124.103 |
| 8,596,660 B2 * | 12/2013 | Hsu et al. .............. 280/124.103 |
| 2005/0012291 A1 * | 1/2005 | Bagnoli .................. 280/124.103 |
| 2005/0167174 A1 * | 8/2005 | Marcacci ........................ 180/76 |
| 2005/0167217 A1 * | 8/2005 | Marcacci ...................... 188/300 |

(Continued)

FOREIGN PATENT DOCUMENTS

| CN | 201670311 U | 12/2010 |
| CN | 202414056 U | 9/2012 |
| EP | 1666346 A1 | 6/2006 |

(Continued)

*Primary Examiner* — Toan To
(74) *Attorney, Agent, or Firm* — Tarolli, Sundheim, Covell & Tummino LLP

(57) ABSTRACT

A motorized reverse trike with a tiltable body comprises a frame with a header pipe, two front wheels, a tilting mechanism arranged on the header pipe, two suspension mechanisms hinged between the two front wheels and the tilting mechanism respectively, a steering mechanism with handlebars hinged between the header pipe and the two suspension mechanisms, and a locking mechanism for locking the tilting mechanism.

5 Claims, 5 Drawing Sheets

(56) References Cited

U.S. PATENT DOCUMENTS

2006/0151232 A1* 7/2006 Marcacci ............... 180/414
2007/0029751 A1* 2/2007 Marcacci ............... 280/124.1

FOREIGN PATENT DOCUMENTS

| TW | 200530057 A | 9/2005 |
|----|-------------|--------|
| TW | 201117997 A1 | 6/2011 |

* cited by examiner

MOTORIZED REVERSE TRIKE WITH TILTABLE BODY

TECHNICAL FIELD

The present patent application relates to a motor vehicle, and particularly to a motorized reverse trike with a tiltable body.

BACKGROUND

The existing reversed three wheeled motorcycle is becoming popular with most of the motorcycle fans due to its high driving stability and good steering. Chinese patent publication No. CN 102092435 discloses a reversed three-wheeled motorcycle having the above advantages. By using an inclined unit pivotally arranged on the of the motorcycle frame positioning element, the reversed three wheeled motorcycle can be inclined when moving so that to obtain a good steering flexibility. In the inclined unit, an interlocking lever is pivotally arranged on the positioning element and its two ends respectively pivotally connected to the two inclined side pipe slidably. The interlocking lever can not only guarantee the incline consistency between the two inclined side pipe, and also plays a supporting role to the motorcycle frame with positioning element and the steering mechanism to prevent falling due to gravity. However, because the downward pressure suffered by the interlocking lever is concentrated in its middle portion and the upward support force is applied to its both ends, it's easily to cause the interlocking lever to be bend or even broken due to its middle portion suffer excessive pressure while operating. This results in damage to the reversed three wheeled motorcycle and reduce the safety. This situation easily happens when the reversed three wheeled motorcycle running on a bumpy road.

SUMMARY

The technical problem to be solved by the present patent application is to provide a motorized reverse trike with a tiltable body. Under the condition that the driving stability and steering flexibility are ensured, the motorized reverse trike is not easily damaged, and the operational safety thereof is high.

In order to solve the above problems, the present patent application provides a motorized reverse trike with a tiltable body with below structure. The motorized reverse trike includes a frame with header pipe, a first front wheel, a second front wheel, a tilting mechanism set on the header pipe, a first suspension mechanism hinged between the first front wheel and the tilting mechanism, a second suspension mechanism hinged between the second front wheel and the tilting mechanism, a steering mechanism with handlebar hinged between the header pipe, the first suspension mechanism and the second suspension mechanism, and a locking mechanism for locking the tilting mechanism. The tilting mechanism includes a first upper rocker arm, a second upper rocker arm, a first lower rocker arm, a second lower rocker arm, a first side pipe, a second side pipe, a first support plate, a second support plate, a first support rod, a second support rod, a third support rod and a fourth support rod. The first upper rocker arm, the second upper rocker arm, the first lower rocker arm and the second lower rocker arm are all hinged with the header pipe on one end. The other side of the first upper rocker arm and the first lower rocker arm are hinged with the both ends of the first side pipe. The other side of the second upper rocker arm and the second lower rocker arm are hinged with the both ends of the second side pipe. The first support plate is hinged with the front side of the header pipe. The second support plate is hinged with the back side of the header pipe. The first support rod is hinged between the first support plate and the middle portion of the first lower rocker arm. The second support rod is hinged between the first support plate and the middle portion of the second lower rocker arm. The third support rod is hinged between the second support plate and the middle portion of the first lower rocker arm. The forth support rod is hinged between the second support plate and the middle portion of the second lower rocker arm. One end of the first suspension mechanism is hinged with the first side pipe. One end of the second suspension mechanism is hinged with the second side pipe.

In the motorized reverse trike with a tiltable body of the present patent application, the locking mechanism includes brake switch, brake disc and fixed brake pad, active brake pad and brake pump with the multiple-threaded screws. The brake switch is connected to the handlebars. The brake disc is connected to the first support plate. The brake pump is connected to the front side of the header pipe through a pump base and makes the brake disc to be located between the fixed brake pad and active brake pad. One end of the multiple-threaded screw pressed against the active brake pad, the other end of the multiple-threaded screw is connected to a rotating paddle. The brake switch and the paddle are connected through brake cable. The pump base is arranged with a guide piece which allows the brake cable to pass through and guide the brake cable.

In the motorized reverse trike with a tiltable body of the present patent application, the steering mechanism includes a steering linkage, ball joint assembly, direction pillar hinged with the header pipe, and the handlebars connected to the upper end of the direction pillar. The lower end of the direction pillar is arranged with rotating arm. The middle portion of the steering linkage is hinged with the ball-headed rod of the ball joint assembly. One side of the steering linkage is connected with the first suspension mechanism by the first ball joint. The other side of the steering linkage is connected with the second suspension mechanism by the second ball joint, the ball head of the ball joint assembly is connected with the rotating arm.

In the motorized reverse trike with a tiltable body of the present patent application, the first suspension mechanism and the second suspension mechanism both include a front fork, shock absorber, shock rocker arms and conjunction base. The lower side of the conjunction base is connected to the upper side of the front fork and the upper end of the shock absorber. A linkage base is arranged on the lower side wall of the conjunction base. The conjunction base of the first suspension mechanism is hinged with the first side pipe. The conjunction base of the second suspension mechanism is hinged with the second side pipe. The linkage base of the first suspension mechanism is connected to one side of the steering linkage through the first ball joint. The linkage base of the second suspension mechanism is connected to another side of the steering linkage through the second ball joint. The lower side of the shock absorber of the first suspension mechanism is hinged to the first front wheel through one side of the shock rocker arm of the first suspension mechanism. The lower side of the shock absorber of the second suspension mechanism is hinged to the second front wheel through one side of the shock rocker arm of the second suspension mechanism. The lower side of the front fork of the first suspension mechanism is hinged to another side of the shock rocker arm of the first suspension mechanism. The lower side of the front fork of the second suspension mechanism is hinged to another side of the shock rocker arm of the second suspension mechanism.

Comparing with the prior art, the present patent application has the following advantages by using above configuration. The motorized reverse trike with a tiltable body of the present patent application has the first support plate hinged with the front side of the header pipe, the second support plate hinged with the back side of the header pipe, the first support rod hinged between the first support plate and the middle portion of the first lower rocker arm, the second support rod hinged between the first support plate and the middle portion of the second lower rocker arm, the third support rod hinged between the second support plate and the middle portion of the first lower rocker arm, the forth support rod hinged between the second support plate and the middle portion of the second lower rocker arm. In other words, the motorized reverse trike with a tiltable body of the present patent application can transfer the downward pressure suffered by the header pipe to the middle portion of the two lower rocker arms through the two support plates and the four support rods. This makes the two lower rocker arms share the downward pressure suffered by the header pipe. In addition, the position of the downward pressure acting on the two lower rocker arms respectively is closer to the side of the two lower rocker arms where the upward supporting force acts on. Therefore, during use of the motorized reverse trike with a tiltable body of the present patent application, its two lower rocker arms can fully meet the support force of the frame with the header pipe and steering mechanism, and not bend or breakage due to the excessive pressure. Thus, the normal use of the motorized reverse trike with a tiltable body of the present patent application is ensured and the operational safety is greatly improved.

The advantage of the locking mechanism of the motorized reverse trike with a tiltable body of the present patent application is: when the motorized reverse trike with a tiltable body of the present patent application is parked, the user can use the brake pump of the locking mechanism and connect to the header pipe through the cylinder base to lock the locking disc of the first support plate, so that the header pipe and the first support plate can mutual lock and not rotate to each other. So the motorized reverse trike with a tiltable body of the present patent application can avoid rollover due to tilt. In addition, the brake pump uses the multiple-threaded screws. The multiple-threaded screws can make the fixed brake pad and the active brake pad match up faster and tighter than single-threaded screw.

The motorized reverse trike with a tiltable body of the present patent application has linkage bases arranged on the lower side wall of the two conjunction base, and the two linkage bases connect with one side of the steering linkage through a ball joint respectively. Its advantage is: when the steering linkage pull the linkage base to make the suspension mechanism to rotate to achieve the front wheel steering, the force the steering linkage applied to the suspension mechanism can always stay in the horizontal direction, and no longer apply downward pressure to the front wheels, thus reduce the friction between the front wheels and the ground during steering, so that the it's more easily for the users to turn the handlebar.

DETAILED DESCRIPTION

Reference will now be made in detail to a preferred embodiment of the motorized reverse trike with a tiltable body disclosed in the present patent application, examples of which are also provided in the following description.

Figure 1:
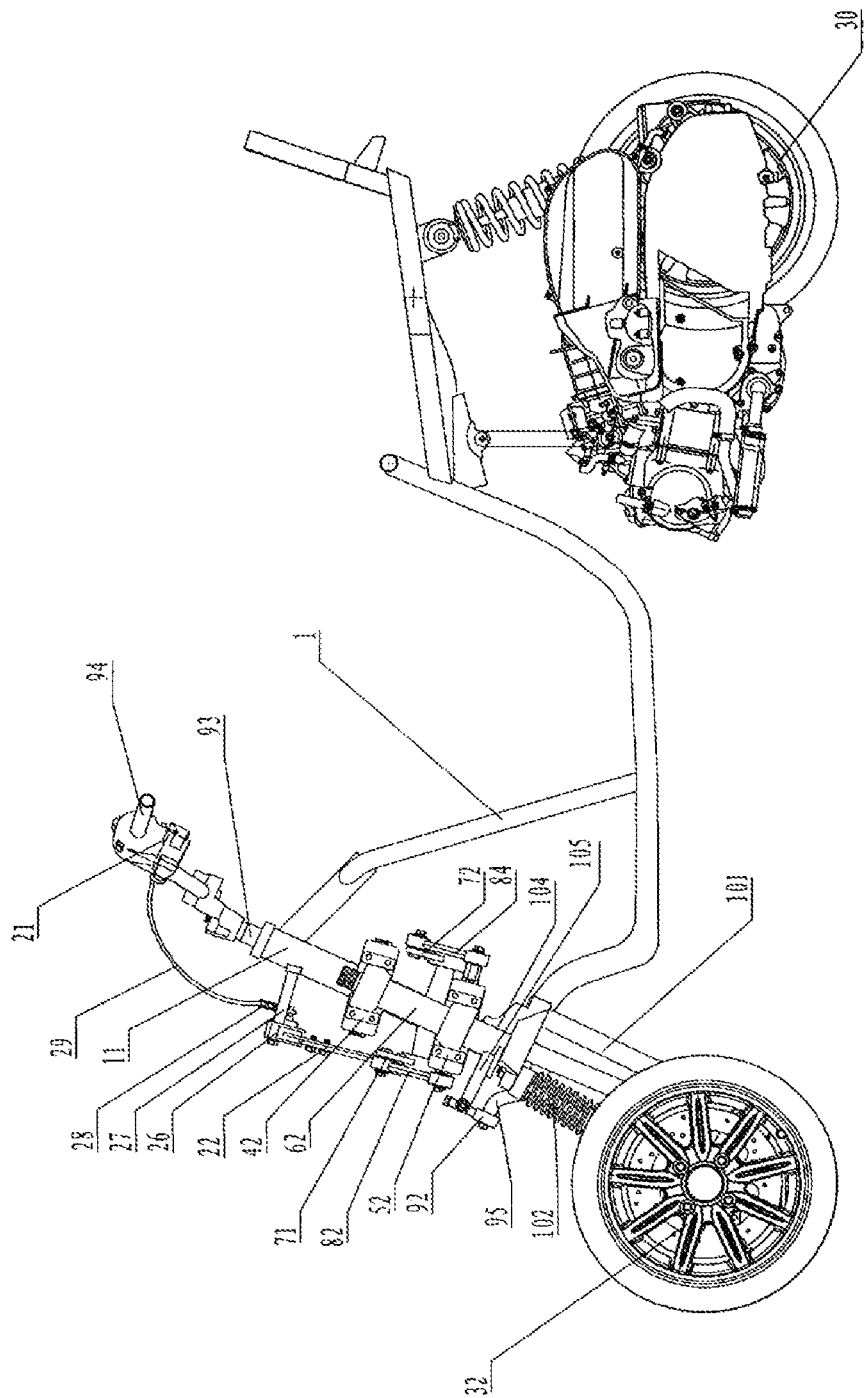
FIG. 1 is a side view of the motorized reverse trike with a tiltable body of the present patent application.
Figure 2:
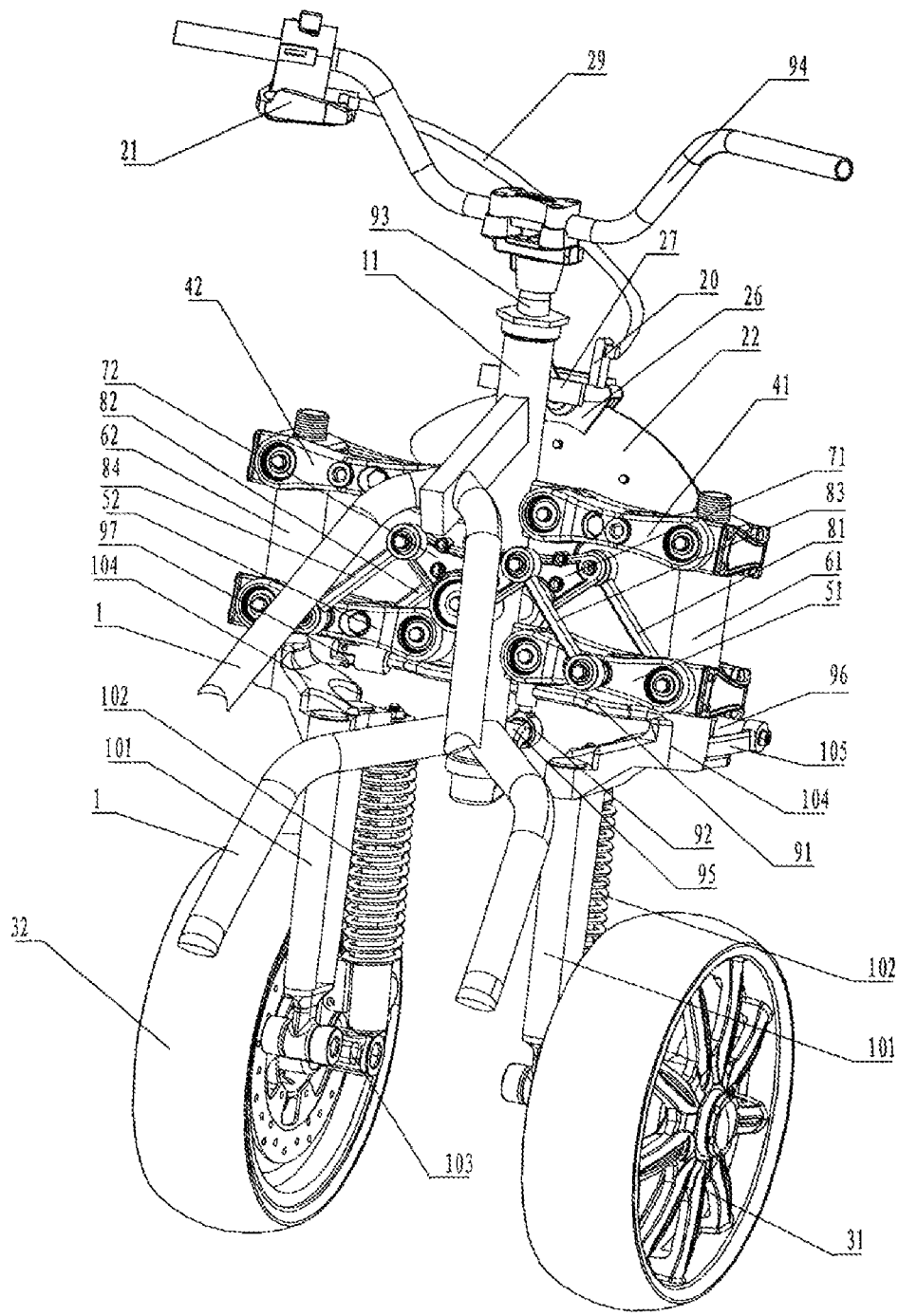
FIG. 2 is a back perspective view of the head of the motorized reverse trike with a tiltable body of the present patent application.
Figure 3:
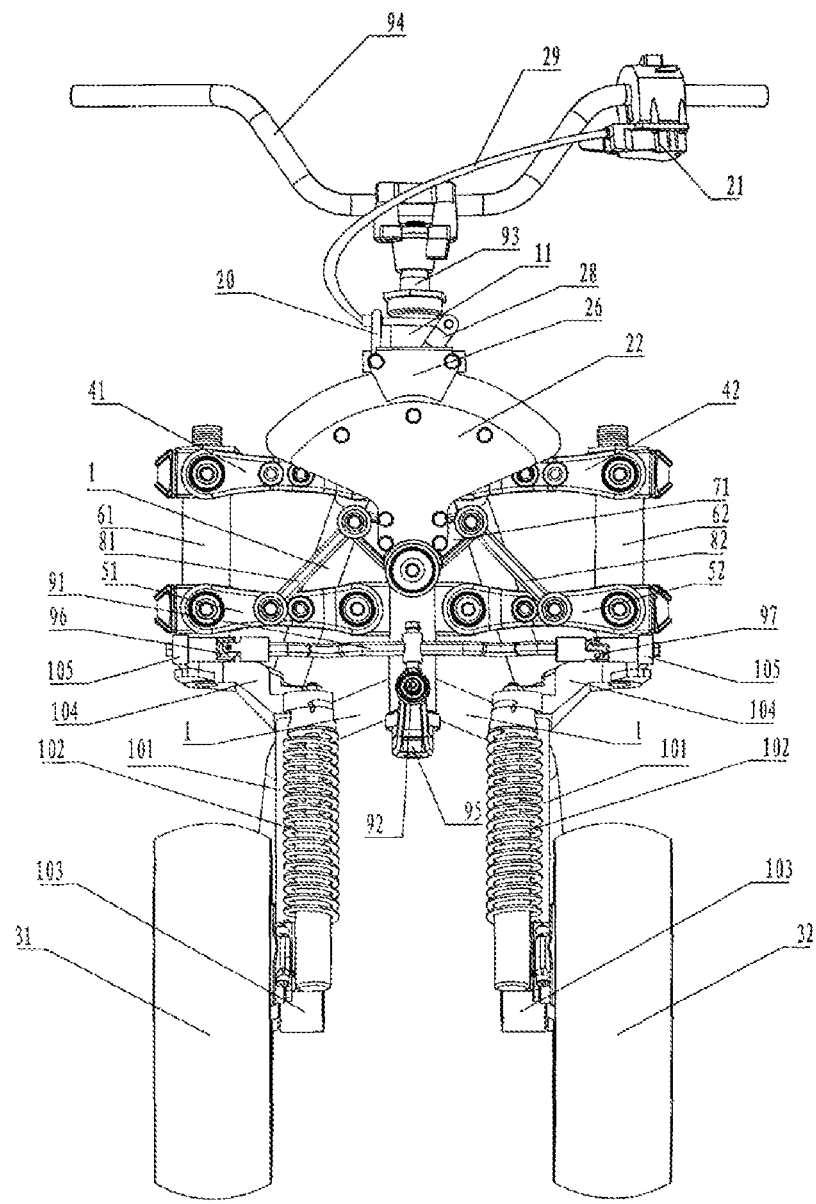
FIG. 3 is a front view of the head of the motorized reverse trike with a tiltable body of the present patent application.
Figure 4:
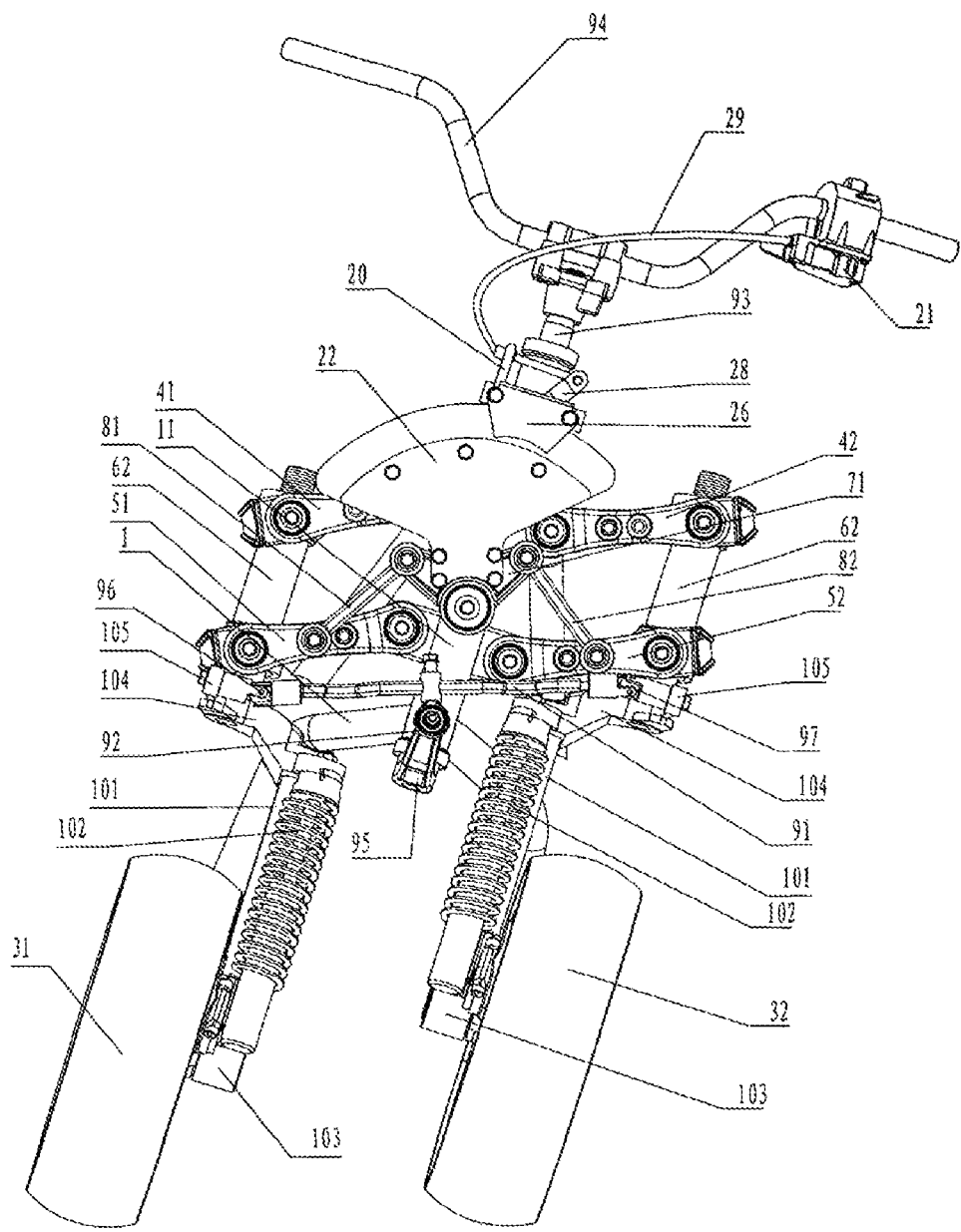
FIG. 4 is a front view of the head of the motorized reverse trike with a tiltable body of the present patent application while the head is tilt.
Figure 5:
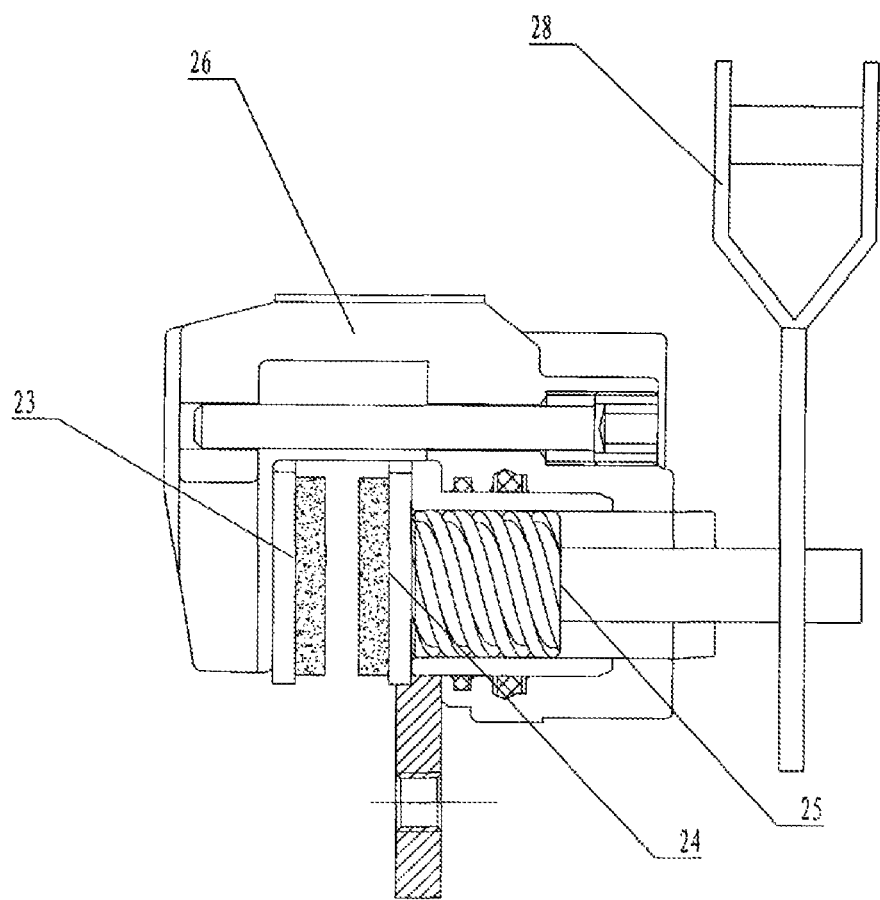
FIG. 5 is an enlarged cross-sectional diagram of a portion of the brake pump of the motorized reverse trike with a tiltable body of the present patent application.

As shown in FIG. 1, FIG. 2, FIG. 3, FIG. 4 and FIG. 5, in the present embodiment, the motorized reverse trike with a tiltable body of the present patent application includes a frame 1 with header pipe 11, a first front wheel 31, a second front wheel 32, a back wheel 30 connect to the back side of the frame 1, a tilting mechanism set on the header pipe 11, a first suspension mechanism hinged between the first front wheel 31 and the tilting mechanism, a second suspension mechanism hinged between the second front wheel 32 and the tilting mechanism, a steering mechanism with handlebar 94 hinged between the header pipe 11, the first suspension mechanism and the second suspension mechanism, and a locking mechanism for locking the tilting mechanism. The tilting mechanism includes a first upper rocker arm 41, a second upper rocker arm 42, a first lower rocker arm 51, a second lower rocker arm 52, a first side pipe 61, a second side pipe 62, a first support plate 71, a second support plate 72, a first support rod 81, a second support rod 82, a third support rod 83 and a fourth support rod 84. The first upper rocker arm 41, the second upper rocker arm 42, the first lower rocker arm 51 and the second lower rocker arm 52 are all hinged with the header pipe 11 on one end. The other side of the first upper rocker arm 41 and the first lower rocker arm 51 are hinged with the both ends of the first side pipe 61. The other side of the second upper rocker arm 42 and the second lower rocker arm 52 are hinged with the both ends of the second side pipe 62. The first support plate 71 is hinged with the front side of the header pipe 11. The second support plate 72 is hinged with the back side of the header pipe 11. The first support rod 81 is hinged between the first support plate 71 and the middle portion of the first lower rocker arm 51. The second support rod 782 is hinged between the first support plate 71 and the middle portion of the second lower rocker arm 52. The third support rod 83 is hinged between the second support plate 72 and the middle portion of the first lower rocker arm 51. The forth support rod 84 is hinged between the second support plate 72 and the middle portion of the second lower rocker arm 52. The locking mechanism includes a brake switch 21, brake disc 22 and fixed brake pad 23, active brake pad 24 and brake pump 26 with the multiple-threaded screws 25. The brake switch 21 is connected to the handlebars 94. The brake disc 22 is connected to the first support plate 71. The brake pump 26 is connected to the front side of the header pipe 11 through a pump base 27 and makes the brake disc 22 to be located between the fixed brake pad 23 and active brake pad 24. One end of the multiple-threaded screw 25 abuts against the active brake pad 24. The other end of the multiple-threaded screw 25 is connected to a rotating paddle 28. The brake switch 21 and the paddle 28 are connected through brake cable 29. The pump base 27 is arranged with a guide piece 20 which allows the brake cable 29 to pass through and guide the brake cable 29. The steering mechanism includes a steering linkage 91, ball joint assembly 92, direction pillar 93 hinged with the header pipe 11, and the handlebars 94 connected to the upper end of the direction pillar 93. The lower end of the direction pillar 93 is arranged with rotating arm 95. The middle portion of the steering linkage 91 is hinged with the ball-headed rod of the ball joint assembly 92. The ball head of the ball joint assembly 92 is connected with the rotating arm 95. The first suspension mechanism and the second suspension mechanism both include a front fork 101, shock absorber 102, shock rocker arms 103 and conjunction base 104 respectively. The lower side of the conjunction base 104 is connected to the upper side of the front fork 101 and the upper end of the shock absorber 102. A linkage base 105 is arranged on the lower side wall of the conjunction base 104. The conjunction base 104 of the first suspension mechanism is hinged with the first side pipe 61. The conjunction base 104 of the second suspension mechanism is hinged with the second side pipe 62. The linkage base 105 of the first suspension mechanism is connected to one side of the steering linkage 91 through the first ball joint 96. The linkage base 105 of the second suspension mechanism is connected to another side of the steering linkage 91 through the second ball joint 97. The lower side of the shock absorber 102 of the first suspension mechanism is hinged to the first front wheel 31 through one side of the shock rocker arm 103 of the first suspension mechanism. The lower side of the shock absorber 102 of the second suspension mechanism is hinged to the second front wheel 32 through one side of the shock rocker arm 103 of the second suspension mechanism. The lower side of the front fork 101 of the first suspension mechanism is hinged to another side of the shock rocker arm 103 of the first suspension mechanism. The lower side of the front fork 101 of the second suspension mechanism is hinged to another side of the shock rocker arm 103 of the second suspension mechanism.

The operation of the motorized reverse trike with a tiltable body of the present patent application is: when the motorized reverse trike with a tiltable body of the present patent application needs to turn in moving, the user can rotate the handlebar 94 at the direction of turning, the handlebar 94 drives the direction pillar 93 to rotate at the direction of turning, the direction pillar 93 drives the rotating arm 95 to rotate at the direction of turning, the rotating arm 95 drives the steering linkage 91 to rotate at the direction of turning by the ball joint assembly 92, the steering linkage 91 drives the conjunction bases 104 of the left and right side to rotate at the direction of turning by the first ball joint 96 and the second ball joint 97 connected to its left and right side respectively. The two conjunction bases 104 drives the front forks 101 connected to it to rotate at the direction of turning. The two front forks 101 drive the corresponding front wheel to rotate at the direction of turning by the shock rocker arm 103 connected to them. The turning of the motorized reverse trike with a tiltable body of the present patent application is thus done. If the speed of the motorized reverse trike with a tiltable body of the present patent application is too fast, the user can control the handlebar 94 to tilt at the direction of turning while rotate the handlebar 94 at the direction of turning. The handlebar 94 drives the direction pillar 93 to tilt at the direction of turning. The direction pillar 93 drives the header pipe 11 to tilt at the direction of turning. The header pipe 11 drives the frame 1 to tilt at the direction of turning. At this time, the two upper rocker arms and the two lower rocker arms both rotate relative to the header pipe 11 and move toward the direction of turning, pulled by the header pipe 11. Under the combined action of the two upper rocker arms and the two lower rocker arms, the two side pipes also tilt to the direction of turning, the two side pipes drive the conjunction bases 104 hinged with it to tilt to the direction of turning, the two conjunction bases 104 drive the front forks 101 connected with it to tilt to the direction of turning, the two front forks 101 drive the corresponding front wheels to tilt to the direction of turning by the shock rocker arm 103 connected to them, the tilt of entire body of the motorized reverse trike with a tiltable body of the present patent application is thus done. The tilt mechanism achieves the assistance turning of the entire body of the motorized reverse trike with a tiltable body of the present patent application and improves the steering flexibility of the motorized reverse trike with a tiltable body of the present patent application. When the motorized reverse trike with a tiltable body of the present patent application park, the user can open the brake switch 21, the brake switch 21 pull the rotating paddle 28 through the brake cable 29, the rotating paddle 28 drive the multiple-threaded screws 25 to rotate, thus make the multiple-threaded screws 25 and the active brake pad 24 to move toward the fixed brake pad 23. Finally, under the combined action of the fixed brake pad 23 and the active brake pad 24, the brake pump 26 lock the brake disc 22, and block the first support plate 71 to make it cannot rotate relevant to the header pipe 11, which means that the tilt mechanism cannot tile, and thus prevent the motorized reverse trike with a tiltable body of the present patent application from rollover when parking.

The above are only the description of the preferred embodiments of the present patent application, not to limit the scope of the present patent application. Without departing from the spirit or scope of the present patent application, various changes and modifications thereof made by one skilled in the art fall into the scope of the present patent application.

The invention claimed is:

1. A motorized reverse trike with a tiltable body, comprises:
    a frame with header pipe;
    a first front wheel;
    a second front wheel;
    a tilting mechanism arranged on the header pipe;
    a first suspension mechanism hinged between the first front wheel and the tilting mechanism;
    a second suspension mechanism hinged between the second front wheel and the tilting mechanism;
    a steering mechanism with handlebar hinged between the header pipe, the first suspension mechanism and the second suspension mechanism; and
    a locking mechanism for locking the tilting mechanism;
    wherein the tilting mechanism comprises a first upper rocker arm, a second upper rocker arm, a first lower rocker arm, a second lower rocker arm, a first side pipe, a second side pipe, a first support plate, a second support plate, a first support rod, a second support rod, a third support rod and a fourth support rod, the first upper rocker arm and the second upper rocker arm;
    one end of the first lower rocker arm, the second lower rocker arm, the first upper rocker arm and the second upper rocker arm are hinged with the header pipe, another end of the first upper rocker arm and the first lower rocker arm are hinged with the both ends of the first side pipe, another end of the second lower rocker arm and the second upper rocker arm are hinged with the both ends of the second side pipe;
    the first support plate is hinged with a front side of the header pipe, the second support plate is hinged with a back side of the header pipe;

the first support rod is hinged between the first support plate and a middle portion of the first lower rocker arm;

the second support rod is hinged between the first support plate and a middle portion of the second lower rocker arm;

the third support rod is hinged between the second support plate and the middle portion of the first lower rocker arm;

the forth support rod is hinged between the second support plate and the middle portion of the second lower rocker arm; and one end of the first suspension mechanism is hinged with the first side pipe, and one end of the second suspension mechanism is hinged with the second side pipe.

2. The motorized reverse trike with a tiltable body of claim 1, wherein the locking mechanism comprises a brake switch, a brake disc and a fixed brake pad, an active brake pad and a brake pump with the multiple-threaded screws; the brake switch is connected to the handlebars, the brake disc is connected to the first support plate, the brake pump is connected to the front side of the header pipe through a pump base and makes the brake disc to be located between the fixed brake pad and active brake pad; one end of the multiple-threaded screw abuts against the active brake pad, the other end of the multiple-threaded screw is connected to a rotating paddle;the brake switch and the paddle are connected through a brake cable; the pump base is arranged with a guide piece which allows the brake cable to pass through and guides the brake cable.

3. The motorized reverse trike with a tiltable body of claim 1, wherein the steering mechanism comprises a steering linkage, a ball joint assembly, a direction pillar hinged with the header pipe, and handlebars connected to an upper end of the direction pillar, and a rotating arm arranged at a lower end of the direction pillar; a middle portion of the steering linkage is hinged with the ball-headed rod of the ball joint assembly, one side of the steering linkage is connected with the first suspension mechanism by the first ball joint, another side of the steering linkage is connected with the second suspension mechanism by the second ball joint; and the ball head of the ball joint assembly is connected with the rotating arm.

4. The motorized reverse trike with a tiltable body of claim 3, wherein each of the first suspension mechanism and the second suspension mechanism comprises a front fork, shock absorber, shock rocker arm and conjunction base respectively; a lower side of the conjunction base is connected to an upper side of the front fork and an upper end of the shock absorber respectively; a linkage base is arranged on the lower side wall of the conjunction base; the conjunction base of the first suspension mechanism is hinged with the first side pipe; the conjunction base of the second suspension mechanism is hinged with the second side pipe; the linkage base of the first suspension mechanism is connected to one side of the steering linkage through the first ball joint, the linkage base of the second suspension mechanism is connected to another side of the steering linkage through the second ball joint; the lower side of the shock absorber of the first suspension mechanism is hinged to the first front wheel through one side of the shock rocker arm of the first suspension mechanism, the he lower side of the shock absorber of the second suspension mechanism is hinged to the second front wheel through one side of the shock rocker arm of the second suspension mechanism; the lower side of the front fork of the first suspension mechanism is hinged to another side of the shock rocker arm of the first suspension mechanism , the lower side of the front fork of the second suspension mechanism is hinged to another side of the shock rocker arm of the second suspension mechanism.

5. The motorized reverse trike with a tiltable body of claim 2, wherein the steering mechanism comprises a steering linkage, a ball joint assembly, a direction pillar hinged with the header pipe, and handlebars connected to an upper end of the direction pillar, and a rotating arm arranged at a lower end of the direction pillar; a middle portion of the steering linkage is hinged with the ball-headed rod of the ball joint assembly, one side of the steering linkage is connected with the first suspension mechanism by the first ball joint, another side of the steering linkage is connected with the second suspension mechanism by the second ball joint; and the ball head of the ball joint assembly is connected with the rotating arm.

\* \* \* \* \*